UNITED STATES PATENT OFFICE.

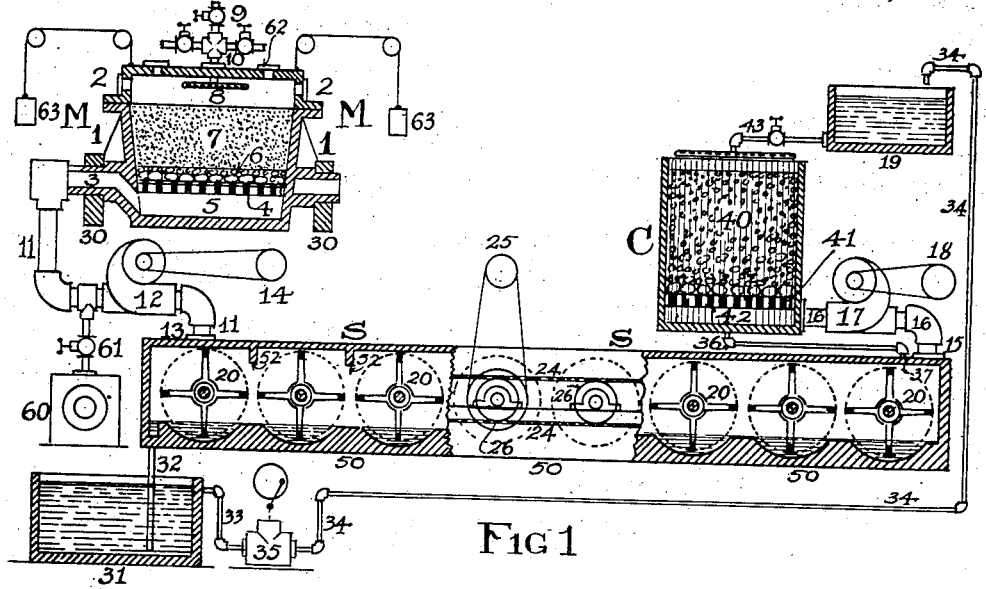

WILLIAM E. GREENAWALT, OF DENVER, COLORADO.

APPARATUS FOR TREATING LIQUIDS WITH GASES.

1,347,089.　　　　Specification of Letters Patent.　　Patented July 20, 1920.

Application filed March 25, 1915, Serial No. 16,962. Renewed February 27, 1920. Serial No. 361,723.

*To all whom it may concern:*

Be it known that I, WILLIAM E. GREENA-WALT, a citizen of the United States, residing in the city and county of Denver and State of Colorado, have invented certain new and useful Improvements in Apparatus for Treating Liquids with Gases, of which the following is a specification.

The invention will be more particularly described in the treatment of gases with liquids resulting from metallurgical operations, such for example, as the recovery of metals from volatile fumes, as set forth more particularly in my co-pending application, Serial No. 2584, filed January 16, 1915, although it is not intended to limit it to this use.

It has long been known, that under certain conditions of roasting ores, especially chloridizing roasting, some of the values pass off as volatile fumes, and that by intensifying the conditions under which volatilization occurs, such as temperature and air supply, practically all the metals, such as gold, silver, copper, and lead, may be volatilized. Metallurgical processes have been based on this volatility of the metal chlorids to extract the metals from their ores without leaching, but so far none of these processes have come into practical use, largely on account of the great amount of gas and dust issuing from the furnace, and largely on account of the lack of suitable methods and apparatus for recovering the values from the fumes.

In my previous application above referred to, the object is to minimize the volume of the gas and eliminate the dust. In the present application the object is to provide a simple and effective apparatus for recovering the metal values from the furnace gases.

Hitherto, the usual method of treating furnace gases, either to recover volatile metals, or to condense acids, has been to pass the gases through a scrubbing tower, or condensing tower, in which the gases are passed upwardly while a spray of water is passed downwardly.

Such methods of condensation have not proved effective. The contact of water and gas is of short duration, and the contact is not good, since the water is not sufficiently sub-divided. In such scrubbing towers channels cannot be avoided, so that the gases escape, improperly treated, through these channels. Then, too, the dust in the gases has been a great evil, for, as it is forced into the condenser, the water, at the point of entrance, is insufficient, and the dust accumulates, and clogs the gas passages in the condenser.

In my present invention all these troubles are overcome, and the gases can be effectually treated. Dust, as it ordinarily occurs in fumes, does not and cannot give any trouble.

The apparatus is best described by referring to the accompanying drawing, in which Figure 1 represents the apparatus in connection with other apparatus with which it may be used. Fig. 2, a detail cross section. Fig. 3, a detail longitudinal section. Fig. 4 and Fig. 5, detail cross section and longitudinal section, respectively, of a modification of the apparatus. Fig. 6, a detail of the paddles.

In the drawings, M represents a metallurgical furnace, or other source of producing gas to be treated. S, the scrubber, or gas treatment apparatus, and C, a condensing tower or reaction chamber through which the gases are passed after having passed through the scrubber.

Referring to the figures, and having in mind more particularly, for the present, the volatilization of metals from their ores, the furnace M consists of a lower part, or holder, 1, containing the ore to be treated, and an upper part, or hood, 2, to confine and direct the various gases, such as air, sulfur dioxid, hydrocarbons, or steam, through the ore, by suction working from below.

The holder 1, is mounted on trunnions, one of which is hollow, 3, and communicates with a chamber 5, in the bottom of the holder, formed by the grates 4. On top of the grates is placed a porous hearth, 6, which supports the fine ore 7, to be treated while the gases are passing through it.

The ore, mixed with salt and sulfid and possibly also carbonaceous fuel, is charged into the holder 1, and the exhauster 12 started, which induces a blast of air through the ore. The ore may be ignited or heated by introducing oil into the hood 2, through the pipe 9, by means of compressed air, and atomized and ignited by the igniter 8. The supply of oil is regulated by the valves 10, and the air for ignition and treatment of the ore, through the openings in the hood, 62. As the ore is ignited and heated the metals are volatilized and pass, with the gases, through the ore 7 and the porous hearth 6, through the grates 4, into the chamber 5, and through the hollow trunnion 3, into the pipe 11, and into the exhauster 12, which forces it into the scrubber S, through the opening 13. The scrubber S, consists, preferably, of a long narrow tank or conduit 50, in which are a series of splashers 20, driven by the sprockets 26, and sprocket chains 24, and actuated by the motor 25.

The splashers 20, consist of a shaft 21, on which are mounted spindles 22, and connecting the spindles are paddles 23. The shaft is mounted on pillow blocks 27, on the outside of the conduit 50, through which the shafts revolve, and the openings are maintained tight by the stuffing boxes 28. The splashers 20 are revolved at a fairly high speed, and dip into the liquid in the bottom of the conduit.

In the bottom of the tank, or conduit, 50, are, preferably, pockets 52, formed by depressions concentric with the circumference of the rotating paddles, and designated by 51, thus forming a pool of the liquid used in the treatment of the gases, thus making the splashing very effective, and making it possible to use small amounts of liquid and bring it all under treatment.

15 is the outlet for the gases, and by means of the exhauster 17, driven by the motor 18, is exhausted from the scrubber S, through the pipe 16, and forced into the condensing or reaction tower C. The tower C, may be filled with inert material, such as quartz, coke, or brick, but preferably with material capable of acting chemically on the values in the fumes to precipitate them, such for example, as granulated iron 40, resting on a perforated support 41, and forming with the bottom of the condenser ducts 42, by means of which the gases are evenly distributed and percolated evenly upward through the mass of material 40.

Water, or other liquid, is drawn form the tank 19, through the pipe 43, and sprayed over the mass of material 40, by means of which the condensed or precipitated values are washed down into the ducts 42, and from there flow through the pipe 36, and opening 37, into the scrubber S, and over the bottom of the conduit 50, filling the pockets 52, thus forming pools to facilitate the action of the splashers 20.

The splashers 20, revolve at a fairly high speed, and as the paddles hit the pools of water or other liquid the liquid is sprayed upwardly and in extremely fine particles through the entire conduit.

The gases, entering the conduit at 13, are intimately mixed with the sprayed liquid, and in so doing, the metal values and acids are condensed, or precipitated, into the liquid. The gases issuing from the scrubber are usually free from metal values, but should there still be any values in the fumes, they are precipitated in passing through the condensing or reaction tower C.

If desired, the scrubber S may be used to simply wash and reduce the gases, while the values may be precipitated in the condenser C by reacting with the granulated iron 40.

Ordinarily there will be a continuous small flow of liquid through the scrubber, from the condenser, and the liquid containing the condensed or precipitated values flows from the scrubber S through the outlet 32 into the tank 31, where it may be treated to recover the metal values from the solution. The liquid may then be wasted, or through the pipe 33 flowed into the pump 35, and forced through the pipe 34 back into the tank 19, and again started on another circuit.

Should it be desirable to make a solution rich in condensed or precipitated values, a body of the liquid may be maintained in the bottom of the conduit, as shown in Fig. 4 and Fig. 5, and re-used until saturated, or until it is desired to remove it. Or the stream may be continuous, but very small, while a large pool of the liquid is maintained, so that the desired degree of solution may be maintained. A large pool of liquid, as shown in Fig. 4 and Fig. 5, is best used to get a strong acid solution from furnace gases, or strong metal solutions, before it is desirable to precipitate the metals either chemically or electrolytically. It is also a desirable condition for the absorption of gases like chlorin, in water, to get a strong saturated solution.

The apparatus may also be used as an effective precipitator of metal values, either from fumes or from the solution. If it is to be used as a precipitator, the precipitating gas, such as hydrogen sulfid, may be generated in the apparatus 60, and flowing into the pipe main 11, through the pipe 61, is forced with the furnace gas into the scrubber S, where the gas and liquid are intimately mixed and the precipitation made complete without the loss of precipitant. Similarly, if the liquid is, say, a metal solution from which the values are to be precipitated with a gaseous precipitant. The precipitant may be generated, either in the apparatus 60 or in the apparatus M, and by means of the exhauster 12 forced into the scrubber S, where it is intimately mixed with the metal solution, so that all the values in the solution are quickly precipitated, and no precipitant is wasted, for the leaner precipitating gas is continually coming in contact with the richer metal solution as it approaches the inlet for the solution and the outlet for the gas.

It is evident that with the revolving splashers the entire interior of the scrubber S is filled with a very dense mist and fine drops of liquid, and as the gases come in contact with the splashers, the gases and liquid are so thoroughly mixed and churned that the gases are quickly and thoroughly deprived of their volatile and condensable values. If the gases are hot, as they usually are, dense clouds of steam are formed which aid in the condensation or precipitation, and the fine liquid spray quickly brings the values into solution. If any of the values are carried out of the exit mechanically in the steam or spray the condenser C will effectively intercept them, and thus avoid any loss. As fast as the sprayed liquid drops to the bottom of the conduit 50, it is again elevated and sprayed into the gas by the splashers 20.

If a large amount of liquid were used the power required would be excessive. Equally good or better results can be obtained with a small stream of the liquid, and, as this liquid will collect in pools as it flows through the conduit, it is effectively sprayed and splashed and brought into intimate contact with the gas by the splashers 20. It will be observed that the paddles 23 are so shaped with a curve 29, Fig. 6, that the liquid is scooped up from the pools and sprayed upwardly, and as it is sprayed and lifted, it is further agitated and subdivided by hitting the top of the conduit, and being hit by the rotating paddles. Similarly, the curve 51, of the depressions forming the pools, tend to throw the liquid upwardly when hit by the rotating splashers. If desired, baffles 52, may be inserted in the upper part of the conduit to prevent too even a flow of the gases along the top, but this will not usually be necessary, as the revolving splashers effectively prevent any such action, and while the gases are churned up with the liquid there is a general movement of the gases toward the exit, while there is also a general movement of the liquid in the opposite direction, although the direction of the liquid is not very material. If it is desired to increase the rate of flow of liquid, without increasing the quantity, the conduit 50 may be built on a slight incline.

It is evident that dust in the fumes cannot seriously interfere with the working of the apparatus. What makes the dust so troublesome in an ordinary scrubbing tower is that the liquid is insufficient and ineffectively applied at the point of entrance of the gas to thoroughly wash the dust from the tower filling, so that the dust accumulates and finally fills up the passages. In my apparatus the liquid may be supplied as abundantly as necessary and is so forcibly applied that there can be no chance for the dust to lodge or accumulate.

It is desirable that the scrubber should be under a slight suction so that the gases or metal values cannot escape through leaks or joints in the stuffing boxes. To accomplish this the exhauster 17 is used to relieve the pressure in the scrubber S, and this exhauster can be regulated as desired in connection with the blower 12, to maintain the suction desired and to regulate the speed of the gases through the scrubber.

The conduit 50, may be as long as desired as found necessary to properly condense the values from the fumes or give the absorption desired. By properly regulating the length of the conduit to the conditions, the gases may be made to issue from the scrubber thoroughly treated.

The apparatus may be used for various purposes other than those described, such as washing gas for gas engines, dissolving gases such as ammonia, chlorin or sulfur dioxid, in water, precipitating metals out of solution with a gaseous precipitant, and for cooling, heating, or evaporating liquids. It also offers an effective means for treating ore sludge with a gas, such as chlorin or ammonia, for the extraction of metals, such as gold, silver, and copper, from their ores.

If corrosive gases or liquids are to be treated, only the portion of the splashers in the interior of the conduit need be protected. The exterior shafting, the driving mechanism, and the pillow blocks, being located on the outside of the conduit, and the suction being inwardly, these parts cannot be affected and may be made of ordinary materials used for such purposes. In designing an apparatus for practical work, the width of the conduit will usually be determined by the length of shafting most conveniently employed for the splashers so that the driving mechanism and pillow blocks will be on the outside of the conduit.

In Figs. 4 and 5, is shown the preferred arrangement when an electric current is to be passed through the liquid. The disks 64 are rotatably mounted on the shaft 21 and dip into the liquid at the bottom of the conduit and are immersed in the gas above the liquid. These disks 64, correspond with the paddles 23, and may be electrified and are arranged to spray the liquid into the gas by means of the perforations 66, and the curved or recessed edges 29, similar to the curves 29 on the paddles 23. As the disks are rapidly rotated the perforations 66, and curved edges 29, spray the liquid into the gas, and take a certain amount of the gas into the liquid. In this way the gases are effectively absorbed by the liquid.

If, now, an electric current is passed through the liquid, beneficial results may be obtained. If the gas, for example, is sulfur dioxid resulting from roasting copper ores, the gases are not only washed free of metal values, but much of the sulfur dioxid is converted into sulfuric acid, and this is a valuable by-product for leaching the roasted ore. The sulfur dioxid is absorbed in the liquid, say acidulated water, and the current oxidizes it to sulfur trioxid, and the trioxid, combining with a molecule of water, forms sulfuric acid. This makes a cheap and convenient way to manufacture sulfuric acid at the mines, where sulfur dioxid is usually a waste product. The liquid is at all times charged with the gas, so that the difficulty of the low solubility of sulfur dioxid in water is entirely overcome, for, manifestly, as fast as the sulfur dioxid in the water is converted into acid other sulfur dioxid is absorbed, so that the solution is at all times saturated. The hydrogen liberated in the electrolysis passes off with the excess air and nitrogen.

The current used in the electrolysis, passes from the brushes 70, to the shaft 21, and from the shaft to the disks 64, or spindles 22, and paddles 23, and then through the liquid to the plates 65 and 51. In passing through the liquid, oxygen is released by the electrolytic decomposition of the water, and the nascent oxygen coming in contact with the sulfur dioxid, oxidizes it to sulfuric acid. The plates 65 may be electrically connected with the conduit. The oxygen, when released at the surface of the rapidly rotating disks, is exceeding energetic.

I claim:

1. In apparatus for treating liquids with gases a stationary chamber having a gas inlet and a gas outlet and a liquid inlet and a liquid outlet and adapted to contain a liquid and to confine a gas over the liquid, means operating within said chamber for maintaining the liquid charged with the gas confined over it, and electrical means for causing a chemical reaction between the gas and the liquid.

2. In apparatus for treating liquids with gases, a stationary chamber having a gas inlet and a gas outlet and a liquid inlet and a liquid outlet and adapted to contain a liquid and to confine a gas over the liquid, rotary means operating within the chamber for spraying some of the liquid in the gas confined over it and submerging some of the gas in the liquid, and means for subjecting the liquid and the gas to the action of an electric current.

3. In apparatus for treating liquids with gases, a stationary chamber having a gas inlet and a gas outlet and a liquid inlet and a liquid outlet and adapted to contain a liquid and to confine a gas over the liquid, means operating within said chamber for submerging some of the gas in the liquid, and electrical means for causing a chemical reaction between the liquid and the gas.

4. In apparatus for treating gases with liquids, a sulfur dioxid generator a chamber communicating with the sulfur dioxid generator and arranged to contain a liquid and confine the sulfur dioxid over the liquid, electrical means for converting the sulfur dioxid dissolved in the liquid into sulfuric acid, and means for intimately mixing the gas and liquid in the chamber so that the gas will be absorbed by the liquid as rapidly as the sulfur dioxid is converted into sulfuric acid.

5. In apparatus for treating liquids with gases, a gas generator, a chamber communicating with the gas generator and arranged to contain a liquid and to confine a gas over the liquid, electrodes within said chamber arranged to spray the liquid into the confined gas over it, means for rotating the electrodes with sufficient rapidity to spray the liquid into the gas, and means for supplying the electrodes with electricity.

6. In apparatus for treating liquids with gases, a gas generator, a chamber communicating with the gas generator and arranged to contain a liquid and to confine the gas over the liquid, a series of disks mounted on a shaft and partially submerged in the liquid, a series of stationary plates alternating with the disks, means for rotating the disks so that a portion of the disks will be alternately in the liquid and in the gas over the liquid, and means for passing an electric current through the disks and plates.

7. In apparatus for treating liquids with gases, a gas generator, a stationary chamber communicating with the gas generator at one end and having a gas outlet at the other end and arranged to contain a liquid and to confine the gas from the gas generator over the liquid, means for passing an electric current through the liquid, and rotary means within said chamber for spraying the liquid into the gas above it and thus keeping the liquid saturated with the gas.

8. In apparatus for treating liquids with gases, a gas generator, a chamber communicating with the gas generator and adapted to contain a liquid and to confine a gas over the liquid, disks rotatably mounted having means for spraying the liquid into the gas when rotated and drawing the gas into the liquid, stationary plates alternating with the disks, means for rotating the disks, and means for passing an electric current through the disks and plates.

9. In apparatus for treating liquids with gases, a gas generator, a chamber adapted to contain a liquid and to confine the gas from the gas generator over it and having a gas inlet and a gas outlet and a liquid inlet and a liquid outlet, a plurality of disks rotatably mounted dipping into the liquid and immersed in the gas over the liquid, plates interposed between the disks and alternating with them, means for rotating the disks, and means for passing an electric current through the disks and plates.

10. In apparatus for treating liquids with gases, a gas generator, a chamber communicating with the gas generator and adapted to contain a liquid and to confine a gas over the liquid, rotary means partially submerged in the liquid and partially immersed in the gas located within the chamber for maintaining the liquid saturated with the gas, and means for electrolyzing the liquid saturated with the gas.

11. In apparatus for treating liquids with gases, a stationary chamber having a gas inlet and a gas outlet and a liquid inlet and a liquid outlet and adapted to contain a liquid and to confine a gas over the liquid, electrical means for causing a chemical reaction between the liquid and the gas, and means within the chamber for dissolving the gas in the liquid as rapidly as it is combined with the liquid.

12. In apparatus for treating liquids with gases, a gas generator, a chamber communicating with the gas generator adapted to contain a liquid and to confine the gas from the gas generator over the liquid, a plurality of disks rotatably mounted dipping into the liquid and immersed in the gas, a plurality of plates interposed between the disks, means within said chamber for maintaining the liquid saturated from the gas over it, means for rotating the disks, and means for passing an electric current through the liquid with the disks and plates as electrodes.

13. In apparatus for treating liquids with gases, a stationary chamber adapted to contain a liquid and to confine a gas over the liquid, perforated disks rotatably mounted dipping into the liquid and immersed in the gas thus facilitating the mixing of the gas and the liquid plates interposed between the disks, and means for passing an electric current through the liquid with the disks and plates as electrodes.

14. In apparatus for treating liquids with gases, a chamber adapted to contain a liquid and to confine a gas above the liquid, serrated disks rotatably mounted dipping into the liquid and immersed in the gas, means for rotating the disks, plates interposed between the disks and alternating with them, and means for passing an electric current through the liquid with the disks and plates as electrodes.

15. In apparatus for treating liquids with gases, a gas generator, a stationary chamber having a gas inlet and a gas outlet and a liquid inlet and a liquid outlet and adapted to contain a liquid and to confine a gas over the liquid, means within said chamber for intimately mixing the liquid with the gas confined over it while under the action of an electric current, means for passing an electric current through the liquid, and a condensing tower communicating with the gas outlet to absorb the partially exhausted gas in fresh portions of liquid.

16. In apparatus for treating liquids with gases, a sulfur dioxid generator, a chamber communicating with the sulfur dioxid generator and having a gas inlet and a gas outlet and adapted to contain a liquid and to confine the sulfur dioxid gas over the liquid, means within the chamber for intimately mixing the liquid with the sulfur dioxid gas confined over it, electrical means for causing a chemical reaction between the liquid and the sulfur dioxid, a condensing tower communicating with the gas outlet and adapted to absorb the sulfur dioxid from the partially exhausted gas in fresh liquid, and then introducing this liquid into the chamber to be acted upon by richer sulfur dioxid gas from the gas generator and by the electric current.

17. In electrolytic apparatus, a chamber having a gas inlet and a gas outlet and adapted to contain a liquid and to confine a gas over the liquid, electrodes within said chamber, means within said chamber for charging the liquid with the gas confined over it, rotary means within said chamber for producing relative motion between the electrolyte and the electrodes, and means for supplying an electric current to the electrodes and passing it through the liquid charged with the gas.

18. In electrolytic apparatus, a chamber having a gas inlet and a gas outlet and adapted to contain a liquid and to confine a gas over the liquid, electrodes within said chamber, spraying means within said chamber for spraying the liquid into the gas above it, means within said chamber for agitating the liquid, and electrical means for causing a chemical reaction between the liquid and the gas.

19. In electrolytic apparatus, a chamber having a gas inlet and a gas outlet and adapted to contain a liquid and to confine a gas over the liquid, electrodes within said chamber, spraying means arranged to spray the liquid into the gas confined over it longitudinally with the chamber, and electrical means for causing a chemical reaction between the liquid and the gas.

20. In electrolytic apparatus, a chamber having a gas inlet and a gas outlet and a liquid inlet and a liquid outlet and adapted to contain a liquid and to confine a gas over the liquid, means for causing a flow of gas over the liquid, means for causing a flow of liquid under the gas, means within the chamber for charging the liquid with the gas, and electrical means for causing a chemical reaction between the gas and the liquid.

21. In apparatus for treating liquids with gases, a stationary chamber having a gas inlet and a gas outlet and adapted to contain a liquid and to confine a gas over the liquid, electrodes within said chamber, spraying means within said chamber for spraying the liquid into the gas over it, and means for subjecting the mixture of liquid and gas to the action of an electric current.

22. In electrolytic apparatus a stationary chamber having a gas inlet and a gas outlet and a liquid inlet and a liquid outlet, and adapted to contain a liquid in the lower portion and to confine a gas in the upper portion, means within the chamber for agitating both the liquid and the gas confined over it, and means for subjecting the mixture of liquid and gas to the action of electric current.

23. In electrolytic apparatus adapted for treating liquids with gases, vertical electrodes submerged in the electrolyte and resting on electrical conductors submerged in the electrolyte and making electrical contact therewith.

24. In electrolytic apparatus adapted for treating liquids with gases, a series of vertical electrodes of one polarity alternating with a series of electrodes of the opposite polarity, and a common electrical conductor to the electrodes of one polarity submerged in the electrolyte.

25. In electrolytic apparatus, a stationary chamber adapted to contain a pool of liquid and to confine a gas over the liquid and having a gas inlet and a gas outlet and a liquid inlet and a liquid outlet, means for causing a flow of liquid through the chamber and mingling with the pool, means for causing a flow of gas through the chamber over the pool of liquid, rotary means in connection with the chamber for treating the liquid with the gas by intimately mixing a portion of the gas with a portion of the liquid, and means for passing an electric current through the liquid.

26. In electrolytic apparatus, a stationary chamber adapted to contain a pool of liquid and to confine a gas over the liquid and having a gas inlet and a gas outlet and a liquid inlet and a liquid outlet, means for causing a flow of liquid through the chamber and mingling with the pool, means for causing a flow of gas through the chamber over the pool of liquid, means within the chamber for treating the liquid of the pool with the gas by bringing the gas and liquid into intimate contact by subdivision, and means for electrolyzing the liquid.

WILLIAM E. GREENAWALT.

Witnesses:
HENRY F. SELLERS,
WILBER C. THOMAS.